(12) United States Patent
Yang et al.

(10) Patent No.: US 7,725,118 B2
(45) Date of Patent: May 25, 2010

(54) MULTI-RADIO WIRELESS COMMUNICATION DEVICE AND METHOD FOR COORDINATING COMMUNICATIONS BETWEEN POTENTIALLY INTERFERING RADIOS

(75) Inventors: Xue Yang, Portland, OR (US); Eran Sudak, Tel Aviv (IL); Xingang Guo, Portland, OR (US); Hsin-Yuo Liu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 341 days.

(21) Appl. No.: 11/843,483

(22) Filed: Aug. 22, 2007

(65) Prior Publication Data

US 2009/0054009 A1    Feb. 26, 2009

(51) Int. Cl.
*H04B 7/00* (2006.01)
*H04B 15/00* (2006.01)

(52) U.S. Cl. ............ 455/502; 455/418; 455/420; 455/41.2; 455/500; 455/501; 455/507; 455/509; 455/516; 455/552.1; 455/553.1; 455/63.1; 455/68; 455/69; 370/447; 370/448; 370/503; 370/508; 370/509

(58) Field of Classification Search ......... 455/418–420, 455/41.2, 500–502, 507, 509, 515–516, 550.1, 455/552.1, 553.1, 63.1, 68–69; 370/346–350, 370/503–515, 445–449

See application file for complete search history.

(56) References Cited

U.S. PATENT DOCUMENTS

| | | | | | |
|---|---|---|---|---|---|
| 5,355,368 | A | * | 10/1994 | Dore et al. | 370/296 |
| 5,970,062 | A | * | 10/1999 | Bauchot | 370/310.2 |
| 6,141,336 | A | * | 10/2000 | Bauchot et al. | 370/348 |
| 6,285,662 | B1 | * | 9/2001 | Watanabe et al. | 370/280 |
| 6,795,418 | B2 | * | 9/2004 | Choi | 370/336 |
| 6,967,944 | B2 | * | 11/2005 | Choi | 370/348 |
| 7,280,836 | B2 | * | 10/2007 | Fuccello et al. | 455/452.1 |

(Continued)

FOREIGN PATENT DOCUMENTS

KR    0082103    10/2003

(Continued)

OTHER PUBLICATIONS

"International Application Serial No. PCT/US2008/067296, Search Report mailed Dec. 30, 2008", 2 pgs.

(Continued)

*Primary Examiner*—Tuan A Tran
(74) *Attorney, Agent, or Firm*—Schwegman, Lundberg & Woessner, P.A.; Gregory J. Gorrie

(57) ABSTRACT

Embodiments of a multi-radio wireless communication device having a Worldwide Interoperability for Microwave Access (WiMax) radio module and a Bluetooth (BT) radio module and methods for communicating are generally described herein. Other embodiments may be described and claimed. In some embodiments, a WiMax active signal is asserted by a coexist controller of the WiMax radio module during receipt of a downlink subframe, and the BT radio module aligns a BT slot boundary of either master-to-slave or slave-to-master slot based on timing information conveyed by the WiMax active signal. The WiMax active signal may be de-asserted by the coexist controller during transmission of an uplink subframe by the WiMax radio module.

27 Claims, 7 Drawing Sheets

U.S. PATENT DOCUMENTS

| | | |
|---|---|---|
| 2005/0170776 A1 | 8/2005 | Siorpaes |
| 2006/0053229 A1 | 3/2006 | Choi et al. |
| 2009/0003307 A1* | 1/2009 | Yang et al. .................. 370/350 |

FOREIGN PATENT DOCUMENTS

| | | |
|---|---|---|
| KR | 0010324 | 1/2007 |
| WO | WO-2009/006019 A2 | 1/2009 |
| WO | WO-2009006019 A3 | 1/2009 |
| WO | WO-2009006019 A4 | 1/2009 |

OTHER PUBLICATIONS

"International Application Serial No. PCT/US2008/067296, Written Opinion mailed Dec. 30, 2008", 4 pgs.

* cited by examiner ers may result in packet loss from collisions degrading the communication abilities of the radios. This is especially a concern in multi-radio platforms that include a Worldwide Interoperability for Microwave Access (WiMax) transceiver and Bluetooth (BT) transceiver because their frequency spectrums can be adjacent. Out-of-band (OOB) emissions from one transceiver may interfere with the other transceiver.

MULTI-RADIO WIRELESS COMMUNICATION DEVICE AND METHOD FOR COORDINATING COMMUNICATIONS BETWEEN POTENTIALLY INTERFERING RADIOS

CROSS-REFERENCE TO RELATED APPLICATIONS

This patent application claims priority to U.S. patent application Ser. No. 11/770,200, filed Jun. 28, 2007, entitled "MULTI-RADIO WIRELESS COMMUNICATION DEVICE METHOD FOR SYNCHRONIZING WIRELESS NETWORK AND BLUETOOTH COMMUNICATIONS" which is incorporated herein by reference in its entirety.

TECHNICAL FIELD

Some embodiments pertain to wireless communications. Some embodiments pertain to multi-radio wireless communication devices. Some embodiments pertain to coexistence between WiMax and Bluetooth communications.

BACKGROUND

Multi-radio platforms are wireless communication devices with co-located transceivers that communicate using two or more communication techniques. One issue with multi-radio platforms is that interference between receptions and transmissions of the co-located transceivers may result in packet loss from collisions degrading the communication abilities of the radios. This is especially a concern in multi-radio platforms that include a Worldwide Interoperability for Microwave Access (WiMax) transceiver and Bluetooth (BT) transceiver because their frequency spectrums can be adjacent. Out-of-band (OOB) emissions from one transceiver may interfere with the other transceiver.

Thus, there are general needs for multi-radio wireless communication devices and methods that coordinate activities between the transceivers of multi-radio platforms.

DETAILED DESCRIPTION

The following description and the drawings sufficiently illustrate specific embodiments of the invention to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for those of other embodiments. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Figure 1:
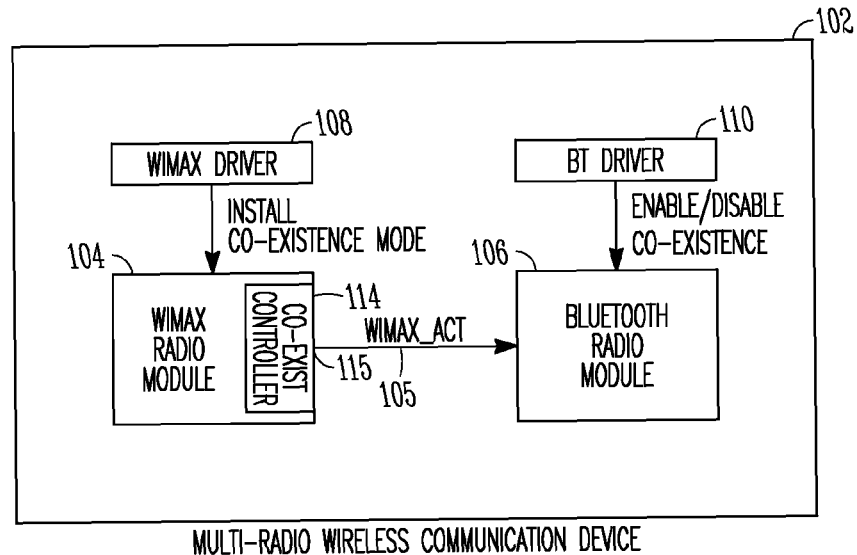
FIG. 1 illustrates a multi-radio wireless communication device having a single-conductor coexistence interface in accordance with some embodiments of the present invention.

FIG. 1 illustrates a multi-radio wireless communication device having a single-conductor coexistence interface in accordance with some embodiments of the present invention. Multi-radio wireless communication device 102 comprises Worldwide Interoperability for Microwave Access (WiMax) radio module 104 for communicating with a WiMax base station, and a Bluetooth (BT) radio module 106 for communicating with a BT device. WiMax radio module 104 includes coexist controller 114 for communicating with BT radio module 106. In these embodiments, WiMax active signal 105 (WIMAX_ACT) is asserted by coexist controller 114 during receipt of a downlink subframe, and BT radio module 106 may refrain from transmitting when WiMax active signal 105 is asserted. In addition, BT radio module 106 may align a BT slot boundary of either master-to-slave or slave-to-master slot based on timing information conveyed by WiMax active signal 105. WiMax active signal 105 may be de-asserted by coexist controller 114 during transmission of an uplink subframe by WiMax radio module 104. In these embodiments, WiMax active signal 105 provides protection for WiMax downlink receptions and provides timing information for the synchronization between BT radio module 106 and WiMax radio module 104. In some embodiments, voice packets, streamed audio and/or video packets, general data packets, and/or human interface active packets, for example, may be communicated between a BT device (not shown) and BT radio module 106, although the scope of the invention is not limited in this respect.

Multi-radio wireless communication device 102 may also include WiMax driver 108 to install coexistence mode functionality on WiMax radio module 104, and BT driver 110 to enable and/or disable coexistence functionality on BT radio module 106. In the embodiments illustrated in FIG. 1, coexist controller 114 comprises single-conductor coexistence interface 115 to provide WiMax active signal 105 to BT radio module 106 on a single conductive path.

Figure 2:
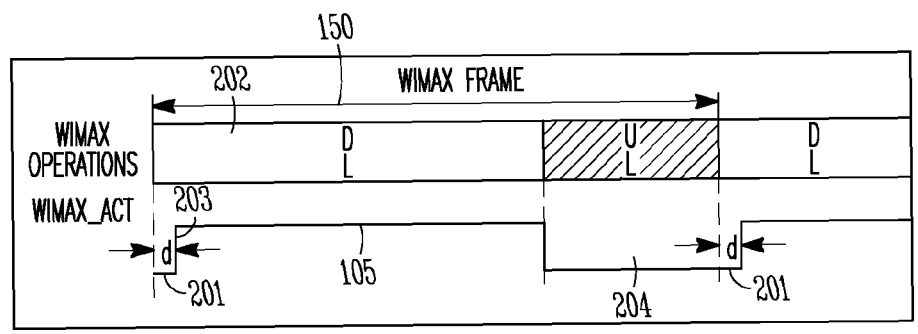
FIG. 2 illustrates the generation of a WiMax active signal in accordance with some embodiments of the present invention.

FIG. 2 illustrates the generation of a WiMax active signal in accordance with some embodiments of the present invention. WiMax frame 150 comprises downlink subframe 202 and uplink subframe 204. As shown, WiMax active signal 105 is asserted during downlink subframe 202, and is de-asserted during uplink subframe 204. In these embodiments, BT radio module 106 may align a BT slot boundary with rising edge 203 of WiMax active signal 105.

In some embodiments, WiMax active signal 105 may be asserted by coexist controller 114 during downlink subframe 202 with a predetermined latency (d) 201. Predetermined latency 201 may be fixed by coexist controller 114 and may range up to approximately a duration of a BT slot (e.g., +/− approximately 625 μs), discussed in more detail below. Although many embodiments are of the present invention are described with BT slots having a duration of approximately 625 μs, the scope of the invention is not limited in this respect.

In some embodiments, BT radio module 106 may be configured to concurrently receive within slave-to-master slots from a BT device when the WiMax radio module 104 is receiving during downlink subframe 202 when WiMax active signal 105 is asserted. BT radio module 106 may also be configured to refrain from transmitting during downlink subframe 202 when WiMax active signal 105 is asserted so that BT transmissions do not significantly interfere with WiMax reception. BT radio module 106 may also be configured to transmit during uplink subframe 204 within master-to-slave slots when WiMax active signal 105 is not asserted. In these embodiments, the controlling of the transmission time by BT radio module 106 may be achieved by time alignment with WiMax active signal 105. In other embodiments, the controlling of the transmission time by BT radio module 106 may be achieved by time alignment with a frame sync signal discussed below.

In some embodiments, BT radio module 106 may also be configured to refrain from receiving during uplink subframe 204 when WiMax active signal 105 is not asserted so that WiMax transmissions don't interfere with BT reception. In the case of some synchronous connection oriented (SCO) transmissions, some receiving slots may be reserved and BT radio module 106 may be unable to refrain from receiving during these reserved receiving slots. In such cases, a further request for retransmissions using extended synchronous (eSCO) can be exploited to recover corrupted packets. At a minimum, WiMax radio module 104 and BT radio module 106 may concurrently transmit, and the WiMax radio module 104 and BT radio module 106 may concurrently receive without interfering with each other.

In some embodiments, BT radio module 106 may be configured to communicate over a BT SCO link, an eSCO link, or BT Asynchronous Connection-Less (ACL) link established with a BT device. When WiMax active signal 105 is asserted during a transmission by BT radio module 106, BT radio module 106 may be configured to stop the transmission and reschedule the transmission in accordance with an automatic retransmission request (ARQ) technique for the established link. In some embodiments, SCO and eSCO links may be used for delay-sensitive transmissions, such as voice communications, which may be provided for a transmission at least every so many slots. ACL links may be used for non-delay-sensitive transmissions which may be provided slots based on availability.

WiMax active signal 105 may serves two purposes in the single-conductor interface embodiments. First, WiMax active signal 105 provides protection for WiMax operations. If BT operations conflict with a certain WiMax operation, WiMax active signal 105 may be asserted whenever a WiMax operation may suffer. For example, when a BT transmission interferes with a WiMax reception, WiMax active signal 105 is asserted whenever WiMax radio module 104 is receiving (i.e., during downlink operations, including Preamble, FCH, MAP, and Data). Second, rising edge 203 of WiMax active signal 105 may also provide timing information for the synchronization between BT and WiMax operations. BT radio module 106 may align its slot boundary (i.e., master-to-slave or slave-to-master slot) to rising edge 203. As illustrated in FIG. 2, WiMax active signal 105 is generated when BT transmissions interfere with WiMax receptions. WiMax active signal 105 is raised high at predetermined latency 201 after the WiMax downlink operation starts. The range of predetermined latency 201 may be within −625 μs to 625 μs. In these embodiments, the value of predetermined latency 201 may be fixed throughout operations once chosen. WiMax active signal 105 may be de-asserted when WiMax uplink operations start.

In some situations, it may be difficult to use single-conductor coexistence interface 115 to convey both the synchronization timing information and to protect WiMax operations. For example, depending on the design of multi-radio wireless communication device 102, WiMax transmissions may interfere with BT receptions but BT operations may not necessarily interfere with WiMax operations. In these situations, WiMax active signal 105 may be kept low all the time making it difficult to provide the timing information with WiMax active signal 105. Additionally, in a practical implementation of BT radio module 106, WiMax active signal 105 may need to be asserted some time before the actual time the DL subframe starts due to processing delay.

Figure 3:
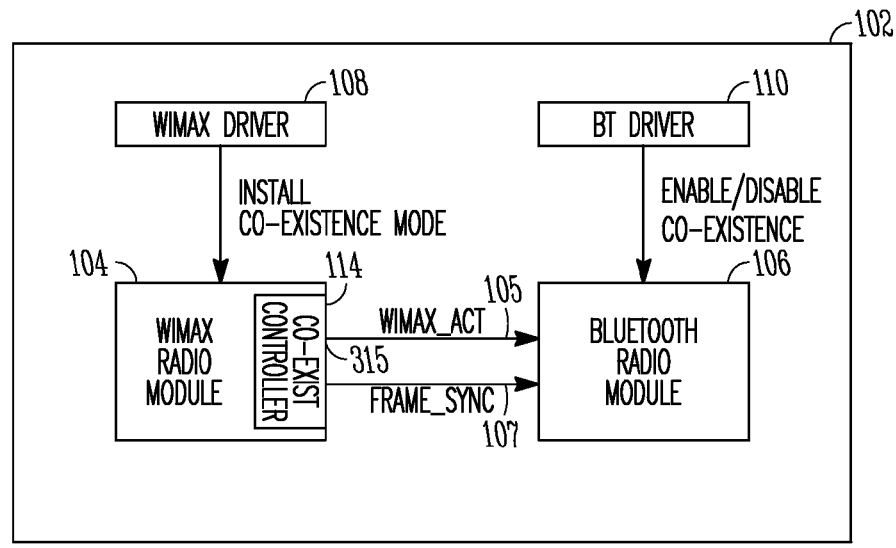
FIG. 3 illustrates a multi-radio wireless communication device having a two-conductor coexistence interface in accordance with some embodiments of the present invention.

FIG. 3 illustrates a multi-radio wireless communication device having a two-conductor coexistence interface in accordance with some embodiments of the present invention. In these embodiments, coexist controller 114 comprises two-conductor coexistence interface 315 to provide WiMax active signal 105 and frame sync signal 107 (FRAME_SYNC) to BT radio module 106 on two separate conductive paths.

In these two-conductor interface embodiments, WiMax active signal 105 provides protection for WiMax operations and frame sync signal 107 may be used for synchronization. If BT operations conflict with certain WiMax operations within multi-radio wireless communication device 102, WiMax active signal 105 may be asserted when WiMax operations may suffer. The timing for the rising/falling edge of WiMax active signal 105 depends on current operation (downlink or uplink operations) of WiMax radio module 104 and the delay involved in detecting and processing WiMax active signal 105.

Figure 4:
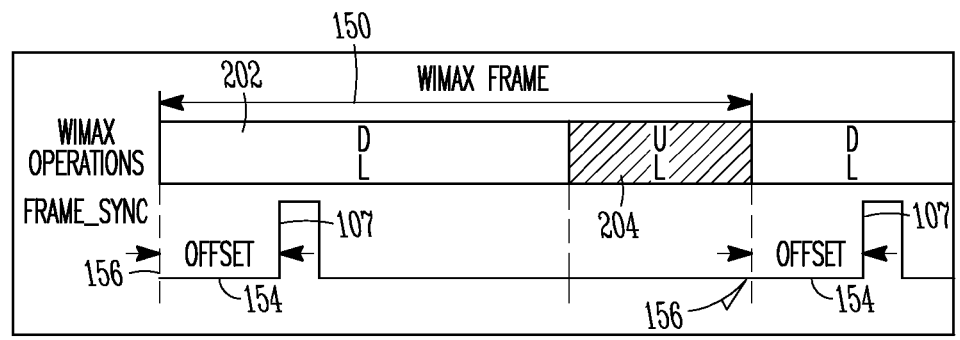
FIG. 4 illustrates the generation of a frame sync signal in accordance with some embodiments of the present invention.

FIG. 4 illustrates the generation of a frame sync signal in accordance with some embodiments of the present invention. In these embodiments, frame sync signal 107 may be generated with offset 154 with respect to start 156 of current WiMax frame 150. Rather than aligning the BT slot boundary with WiMax active signal 105, BT radio module 106 may substantially align a BT slot boundary with frame sync signal 107. Offset 154 may be a fixed offset with respect to start 156 of WiMax frame 150 or may be a varying offset with respect to start 156 of WiMax frame 150. These embodiments with fixed and varying offsets are discussed in more detail below.

Figure 5:
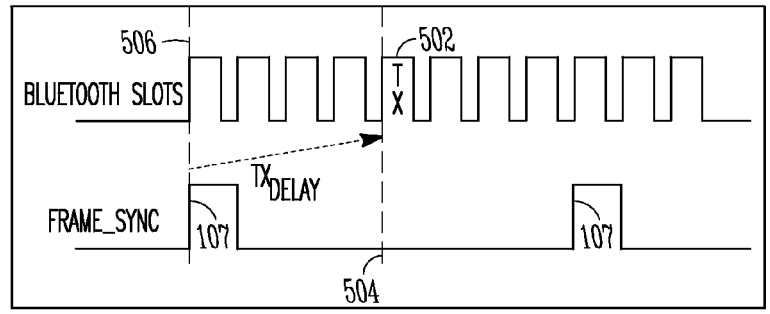
FIG. 5 illustrates the transmission time of BT Asynchronous Connection-Less (ACL) packets in accordance with some embodiments of the present invention.

FIG. 5 illustrates the transmission time of BT Asynchronous Connection-Less (ACL) packets in accordance with some embodiments of the present invention. When frame sync signal 107 is generated with a fixed offset, transmission time 504 for BT transmission slot 502 by BT radio module 106 may be based on a BT packet type and a BT profile (described in more detail below). The fixed offset may range up to approximately a duration of a BT slot (e.g., +/− approximately 625 μs).

In these embodiments, frame sync signal 107 generated by the coexist controller 114 may be set at the fixed offset, regardless of the BT logical link used (SCO or ACL), and regardless of the BT packet types and BT profile used. BT radio module 106 may synchronize with frame sync signal 107 such that its slot boundary 506 (master-to-slave or slave-to-master) aligns with the rising edge of frame sync signal 107. Additionally, when a BT ACL link is used, BT radio module 106 may adjust its transmission start time with reference to the occurring time of rising edge of frame sync signal 107. The determination of relative transmission start time may depend on the BT packet type and BT profile used.

When frame sync signal 107 is generated with a varying offset, the transmission time for an ACL packet transmitted within BT transmission slot 502 may be fixed at a fixed delay after frame sync signal 107. The varying offset may be less than a duration of a WiMax frame 150 (e.g., less than 5 ms).

In the embodiments in which frame sync signal 107 is generated with a varying offset, the value of offset may depend on the BT logical link used, the BT packet type, and the BT profile used. BT radio module 106 may synchronize with frame sync signal 107 such that slot boundary 506 aligns with the rising edge of frame sync signal 107. With a varying offset and when a BT ACL link is used, BT radio module 106 does not need to adjust its transmission time based on packet type and profile used. Instead, BT radio module 106 transmits the ACL packet at a fixed delay after the rising edge of frame sync signal 107.

BT radio module 106 may synchronize its clock with the rising edge of frame sync signal 107 such that slot boundary 506 (master-to-slave slot or slave-to-master slot) aligns with the rising edge of frame sync signal 107. Additionally, BT radio module 106 may refrain from transmitting when WiMax active signal 105 is high (asserted), and may stop a transmission if already started. When a BT eSCO (EV3) link is used, BT radio module 106 may treat the transmission that was stopped by WiMax active signal 105 as a failed transmission, and may reschedule its transmissions (e.g., of DATA or POLL messages) according to the ARQ mechanism defined for the eSCO link.

When a BT ACL link is used, BT radio module 106 may determine when to transmit an ACL packet. As illustrated in FIG. 5, $TX_{delay}$ represents the time between the rising edge of frame sync signal 107 and the transmission starting time of a BT ACL packet. If coexistence interface 315 chooses to use frame sync signal 107 with fixed offset, $TX_{delay}$ may be adjusted by BT radio module 106 depending on the packet type and profile used by the BT radio. On the other hand, if coexistence interface 315 chooses to use frame sync signal 107 with varying offset, $TX_{delay}$ may be a predetermined fixed value.

Figure 6:
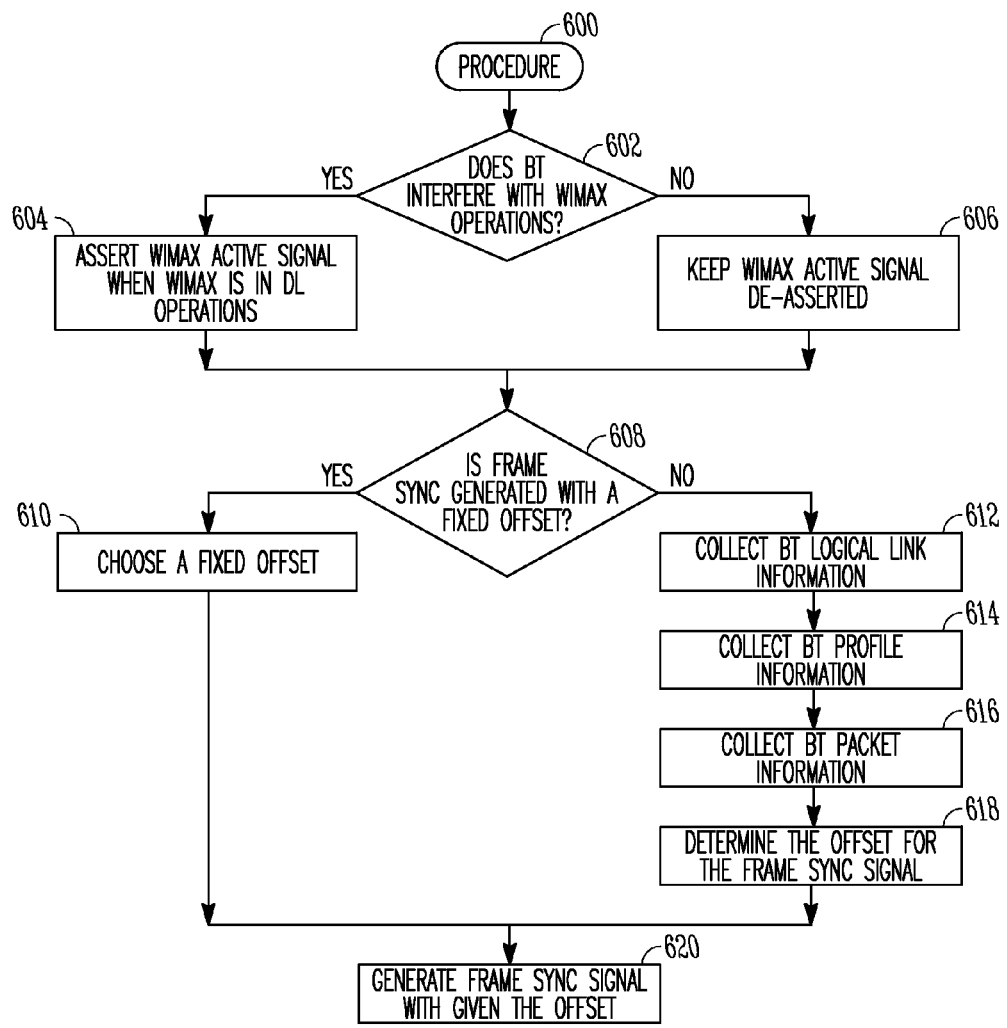
FIG. 6 is a state diagram of a coexistence controller in accordance with some embodiments of the present invention.

FIG. 6 is a procedure performed by coexistence controller 114 in accordance with some embodiments of the present invention. Procedure 600 may be used by coexistence controller 114 to determine when to assert and/or de-assert WiMax active signal 105, and to determine when to generate frame sync signal 107.

In operation 602, coexistence controller 114 may determine whether BT transmissions will significantly interfere with WiMax operations. In these embodiments, WiMax radio module 104 may determine whether or not the BT transmissions by BT radio module 106 significantly interfere with WiMax receptions based on an increased packet error rate or an increased packet loss that may occur when BT radio module 106 is transmitting. The BT request signal, discussed below, may be used for these determinations. When BT transmissions are determined to significantly interfere with WiMax operations, state 604 may be entered in which WiMax active signal 105 is asserted during downlink operations. When BT transmissions are determined not to significantly interfere with WiMax operations, state 606 may be entered in which WiMax active signal 105 will be kept de-asserted.

In operation 608, coexistence controller 114 may determine whether frame sync signal 107 is to be generated with a fixed offset or a varying offset as discussed above. When frame sync signal 107 is to be generated with a fixed offset, operation 610 is performed. When frame sync signal 107 is to be generated with a varying offset, operations 612-618 are performed.

In operation 610, coexistence controller 114 may select a fixed offset of up to a duration of a BT slot (e.g., +/− approximately 625 μs).

Operation 612 collects BT logical link information (i.e., between BT radio module 106 and the external BT device). The BT logical link may be an SCO, eSCO or an ACL link as discussed above. Operation 614 collects information about the BT profile that is to be used. Operation 616 collects BT packet information. Operation 618 determines an offset (i.e., offset 154 (FIG. 4)) for frame sync signal 107 based on the BT logical link information, the BT profile information, and the BT packet information.

In operation 620, frame sync signal 107 is generated with either the fixed offset selected in operation 610, or the varying offset determined in operation 618. In some embodiments, the varying offset may be re-determined whenever the BT logical link information, the BT profile information, or the BT packet information change.

Figure 7:
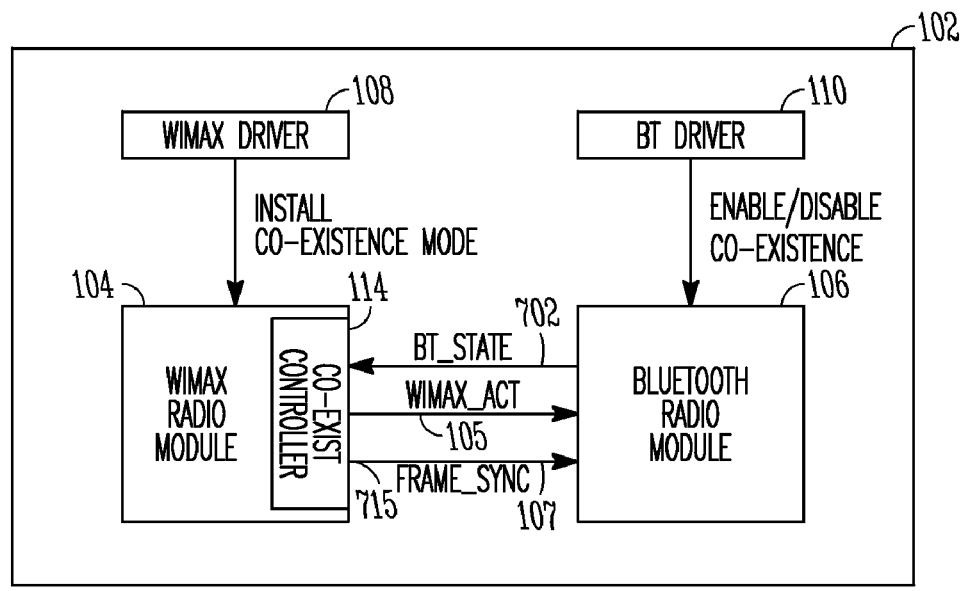
FIG. 7 illustrates a multi-radio wireless communication device having a three-conductor coexistence interface in accordance with some embodiments of the present invention.

FIG. 7 illustrates a multi-radio wireless communication device having a three-conductor coexistence interface in accordance with some embodiments of the present invention. In these embodiments, coexist controller 114 comprises three-conductor coexistence interface 715 to provide WiMax active signal 105 and frame sync signal 107 to BT radio module 106 on two separate conductive paths and to receive BT state signal 702 (BT_STATE) from BT radio module 106 on a third separate conductive path. In these embodiments, BT radio module 106 substantially aligns BT slot boundary 506 with frame sync signal 107.

In these embodiments, BT state signal 702 may be asserted by BT radio module 106 to gain priority over WiMax operations (e.g., for discovery service or link setup operations). Coexist controller 114 may elect, in response to the assertion of BT state signal 702, whether or not to de-assert WiMax active signal 105 and give BT radio module 106 priority. In these embodiments, coexist controller 114 may determine whether or not to give BT radio module 106 priority when BT state signal 702 is asserted based on policies set within WiMax radio module 104. In some embodiments, these policies may be set through software by a network administrator, although the scope of the invention is not limited in this respect.

In the single-conductor interface embodiments and the two-conductor interface embodiments discussed above, WiMax operations are given higher priority and are protected by WiMax active signal 105. BT radio module 106 is prohibited from proceeded with any operations that might interfere with a current WiMax operation. However, in some less-common situations (e.g., the pairing process), it may be desirable to give BT radio operations a momentary higher priority than a current WiMax operation. In the three-conductor interface embodiments, BT state signal 702 is used in addition to frame sync signal 107 and WiMax active signal 105. When asserted, BT state signal 702 may indicate to coexist controller 114 that BT radio module 106 wishes to gain priority over the current WiMax operation. In such a case, and depending on other inputs coexist controller 114 may have from WiMax radio module 104, coexist controller 114 may elect to remove the restriction from BT radio module 106 by de-asserting WiMax active signal 105, and preventing WiMax from transmitting when BT state signal 702 is asserted. In some situations, WiMax operations may encounter some interference from BT radio module 106 momentarily, however, this may allow BT operations to be completed without interference. BT state signal 702 may be used in a way to minimize any adverse effects on WiMax operations.

Figure 8:
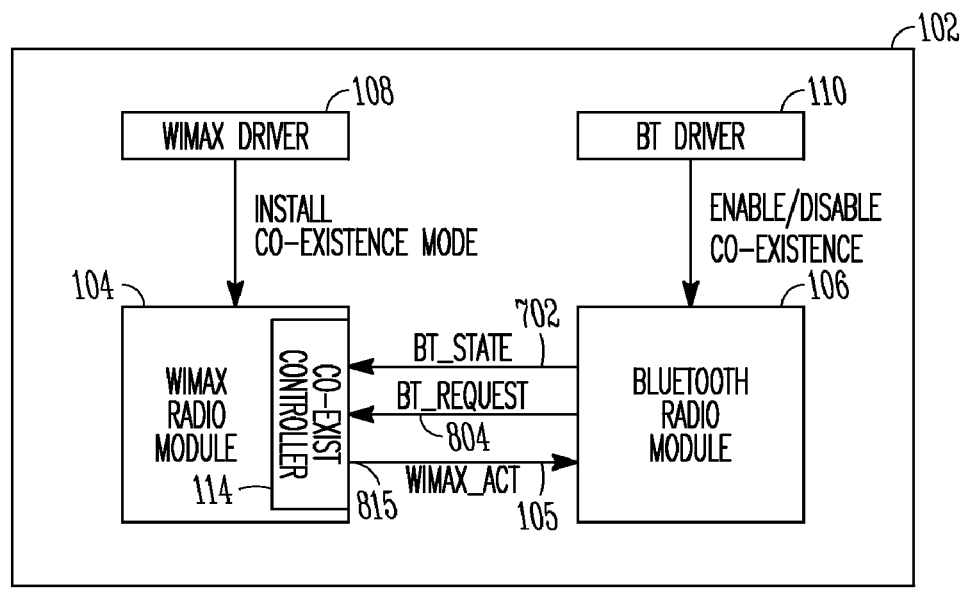
FIG. 8 illustrates a multi-radio wireless communication device having a three-conductor coexistence interface in accordance with some other embodiments of the present invention.

FIG. 8 illustrates a multi-radio wireless communication device having a three-conductor coexistence interface in accordance with some other embodiments of the present invention. In these embodiments, coexist controller 114 comprises three-conductor coexistence interface 815 to provide WiMax active signal 105 to BT radio module 106 on one conductive path and to receive BT state signal 702 and BT request signal 804 (BT_REQUEST) from BT radio module 106 on two separate conductive paths. In these embodiments, the frame sync signal is not used. BT state signal 702 indicates whether BT radio module 106 is requesting priority for a transmission or a reception and may be asserted by BT radio module 106 to gain priority over WiMax operations. BT request signal 804 may indicate that BT radio module 106 is requesting assess to the wireless medium. Coexist controller 114 may elect, in response to the assertion of BT state signal 702 and receipt of BT request signal 804 whether or not to de-assert WiMax active signal 105 and allow BT radio module 106 access to the medium. In these embodiments, BT slot boundary 506 may be substantially aligned with rising edge 203 of WiMax active signal 105.

In these embodiments, WiMax active signal 105 provides protection for WiMax operations. If BT operations conflict with certain WiMax operations, WiMax active signal 105 may be asserted whenever WiMax operations may suffer. The timing for rising/falling edge of WiMax active signal 105 may depends on current operation (downlink or uplink) and a processing delay requirement of BT radio module 106 (e.g., delay involved in detecting and processing WiMax active signal 105). Depending on other inputs received by coexist controller 114 from WiMax radio module 104, coexist controller 114 may elect to remove the restrictions on BT radio module 106 by de-asserting WiMax active signal 105, and may prevent WiMax radio module 104 from transmitting for at least a short duration.

Figure 9:
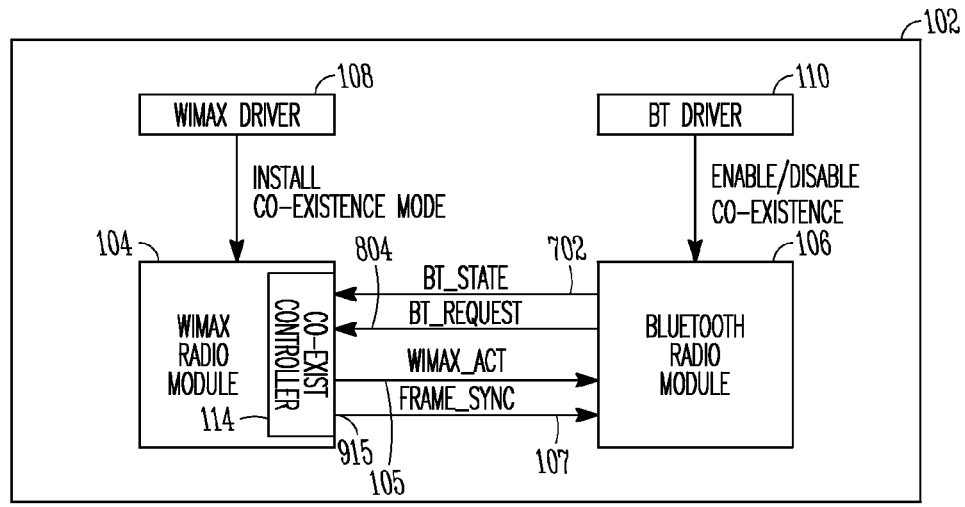
FIG. 9 illustrates a multi-radio wireless communication device having a four-conductor coexistence interface in accordance with some embodiments of the present invention.

FIG. 9 illustrates a multi-radio wireless communication device having a four-conductor coexistence interface in accordance with some embodiments of the present invention. In these embodiments, coexist controller 114 comprises four-conductor coexistence interface 915 to provide WiMax active signal 105 and frame sync signal 107 to BT radio module 106 on two separate conductive paths and to receive BT state signal 702 and BT request signal 804 from BT radio module 106 on two additional separate conductive paths of the interface 915. The operations of these signals are discussed above. In these embodiments, coexist controller 114 may elect, in response to the assertion of BT state signal 702 and/or the receipt of BT request signal 804, whether or not to de-assert WiMax active signal 105 and allow BT radio module 106 access to the medium. In these embodiments, BT slot boundary 506 may be substantially aligned with frame sync signal 107.

Figure 10:
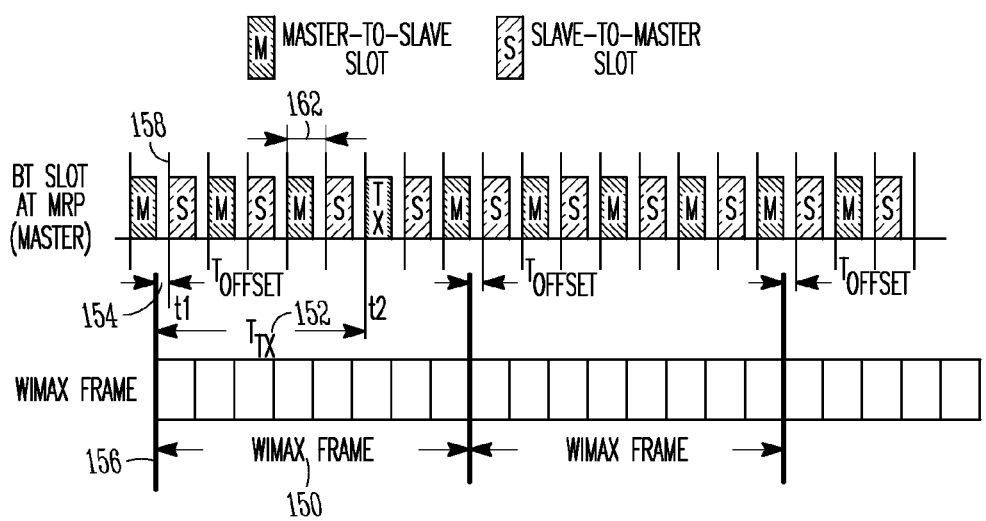
FIG. 10 illustrates a fixed time offset between a start of a WiMax frame and a next BT slave-to-master slot boundary in accordance with some embodiments of the present invention.

FIG. 10 illustrates a fixed time offset between a start of a WiMax frame and a next BT slave-to-master slot boundary in accordance with some embodiments of the present invention. In these embodiments, time offset ($T_{offset}$) 154 between start 156 of WiMax frame 150 and next BT slave-to-master slot boundary 158 is fixed and may be maintained as a fixed constant. Transmission time ($T_{TX}$) 152 may be determined for an ACL packet by BT radio module 106 by adding time offset 154 to a number (N) of BT slot times ($T_{BT\ slot}$) 162. The number (N) of BT slot times 162 may be selected based on a BT profile and whether there is mutual interference or whether WiMax transmissions significantly interfere with BT receptions but BT transmissions do not significantly interfere with WiMax receptions.

Table 1 (below) illustrates the selection of the number (N) of BT slot times 162 when it is determined that there is mutual interference.

TABLE 1

| Co-platform interference type | BT profile | N | Master-to-slave transmitted packet type |
|---|---|---|---|
| WiMax/BT mutual interference | A2DP audio stream out using 3-slot packet | 5 | DM3/DH3 |
| | A2DP audio stream out using 5-slot packet | N/A | DM5/DH5 |
| | A2DP audio stream in | 7 | POLL |
| | HID | 7 | POLL |
| | ACL Data transmission (DM1/DH1) | 7 | DM1/DH1 |
| | ACL Data transmission (DM3/DH3) | 5 | DM3/DH3 |
| | ACL Data transmission (DM5/DH5) | N/A | DM5/DH5 |

Table 2 (below) illustrates the selection of the number (N) of BT slot times 162 when WiMax transmissions significantly interfere with BT receptions but BT transmissions do not significantly interfere with WiMax receptions.

TABLE 2

| Co-platform interference type | BT profile | N | Master-to-slave transmitted packet type |
|---|---|---|---|
| WiMax TX interferes with BT RX only | A2DP audio stream out using 3-slot packet | 5 | DM3/DH3 |
| | A2DP audio stream out using 5-slot packet | 3 | DM5/DH5 |
| | A2DP audio stream in | 7 | POLL |
| | HID | 1, 3, 7 | POLL |
| | ACL Data transmission (DM1/DH1) | 1, 3, 7 | DM1/DH1 |
| | ACL Data transmission (DM3/DH3) | 5 | DM3/DH3 |
| | ACL Data transmission (DM5/DH5) | 3 | DM5/DH5 |

In these embodiments, time offset 154 may be selected to be equal to approximately a duration of a BT slot (e.g., +/− approximately 625 μs), and may be selected based on a ratio of a durations of the downlink subframe to a duration of an uplink subframe and/or the relative clock accuracy of the BT and WiMax radio modules.

In a first usage scenario, BT radio module 106 may have audio streaming in or out, while WiMax radio module 104 is active. In a second usage scenario, BT radio module 106 may connect to BT Human Interface Devices (HID) such as keyboards, pointing devices, gaming devices, and remote monitoring devices, while WiMax radio module 104 is active. In a third usage scenario, BT radio module 106 may have files/objects or other generic ACL data to be transferred to/from other BT devices, while WiMax radio module 104 is active. Without a coexistence solution, the interference between Bluetooth and WiMax may cause severe degradation of user experience in above usage scenarios.

In accordance with embodiments, BT radio module 106 functions in master mode and may operate concurrently with WiMax radio module 104. In these embodiments, WiMax operations may be fully protected while the performance of Bluetooth operations may be maximized. In these embodiments, when BT transmissions potentially interfere with WiMax receptions, BT radio module 106 may refrain from transmitting when WiMax radio module 104 is in downlink operations. Furthermore, BT radio module 106 may stop a transmission that has already started. BT radio module 106 may adjusts its clock based on the frame starting time of WiMax radio module 104 to help synchronize the BT and WiMax operations.

For example, when a WiMax frame that has a duration of 5 milliseconds (ms) and with a BT slot duration of 625 μs, each WiMax frame may be considered as having eight BT slots, as illustrated in FIG. 10. $T_{offset}$ is defined as the time difference between start 156 of WiMax frame ($t_0$ FIG. 10) and the next immediate BT slave-to-master slot boundary at multi-radio wireless communication device 102 ($t_1$ FIG. 10). BT radio module 106 may synchronize its clock with that of WiMax radio module 104 such that $T_{offset}$ is maintained as a fixed constant. In some embodiments, the valid range of $T_{offset}$ is within −625 μs to 625 μs. The determination of $T_{offset}$ may depend on the WiMax downlink-to-uplink ratio and the relative clock accuracy of both BT and WiMax radio modules. In these embodiments, the value of $T_{offset}$ is fixed throughout the operation time of BT radio module 106.

In some embodiments, BT radio module 106 may adjust the transmission time of an ACL packet based on the BT profile used and the type of the ACL packet used. In these embodiments, $T_{TX}$ may be defined as the time difference between the boundary of the slot in which BT radio module 106 transmits a packet ($t_2$ FIG. 10) and the starting time of the most recent WiMax frame 150 (to FIG. 10). Accordingly, $T_{TX}$ may be calculated by the following equation:

$$T_{TX}=T_{offset}+N*T_{BT\_slot} \quad (1)$$

In Equation (1), $T_{BT\_slot}$ is the BT slot time duration and N refers the number of BT slot times selected from either table 1 or table 2 as discussed above. Two different interference scenarios are discussed below.

Figure 11:
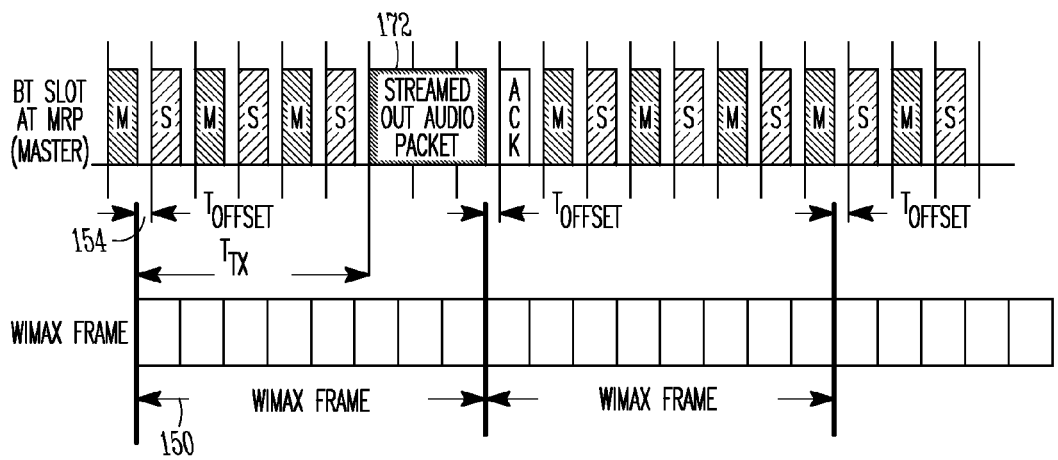
FIG. 11 illustrates the transmission of streamed audio by a BT radio module in accordance with some embodiments of the present invention.

FIG. 11 illustrates the transmission of streamed audio by a BT radio module in accordance with some embodiments of the present invention. In these embodiments, the selection of time offset 154 and a transmission time for transmission by BT radio module 106, for example, may allow for the communication of ACL packets of streamed audio 172 comprising at least 3 BT slots.

In the first interference scenario, mutual interference may exist between BT radio module 106 and WiMax radio module 104. That is, BT transmissions may significantly interfere with WiMax receptions, and WiMax transmissions may significantly interfere with BT receptions. The value of N in equation (1) (corresponding to the transmission time of a Bluetooth ACL packet) in this mutual interference scenario may be selected using Table 1. For example, when BT radio module 106 is streaming audio content out using a 3-slot packet, the value of N may be selected to be 5. Therefore, BT radio module 106 may adjust its audio packet transmission time such that:

$$T_{TX}=T_{offset}+5*625=T_{offset}+3125us$$

With the proper setting of the transmission time $T_{TX}$, 3-slot audio packet 172 may be safely transmitted during the duration of uplink frame 204, provided that WiMax downlink-to-uplink ratio is below a certain threshold. Furthermore, an acknowledgement message from the slave (the external BT device) may be received during WiMax downlink operations. Consequently, BT radio module 106 may be able to properly receive the acknowledgement from the slave. The transmission time for other usage scenarios, such as connecting with HID devices, transmitting 1-slot ACL packet (DM1/DH1), transmitting 3-slot ACL packet (DM3/DH3) and transmitting 5-slot ACL packet (DM5/DH5), may be determined by coexistence interface 114 and applied in the same way.

In the second interference scenario, WiMax transmissions may significantly interfere with Bluetooth receptions but Bluetooth operations may have little or no impact on WiMax operations. The value of N in equation (1) (corresponding to the transmission time of a Bluetooth ACL packet) in this second interference scenario may be selected using Table 2. When BT radio module 106 is receiving audio content streamed in, for example, according to Table 2, the value of N may be 7. In these embodiments, BT radio module 106 may adjust its audio packet transmission time such that:

$$T_{TX}=T_{offset}+7*625=T_{offset}+4375us.$$

Figure 12:
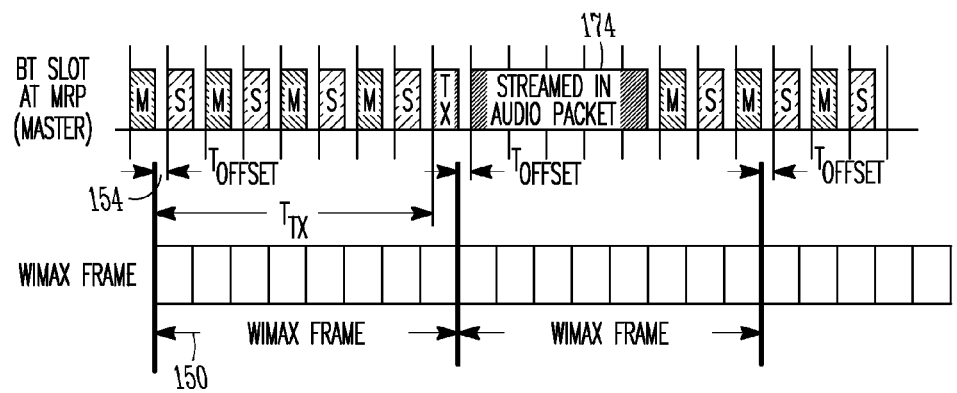
FIG. 12 illustrates the reception of streamed audio by a BT radio module in accordance with some embodiments of the present invention.

FIG. 12 illustrates the reception of streamed-in audio by a BT radio module in accordance with some embodiments of the present invention. As illustrated, streamed-in audio packet 174 may be received when WiMax radio module 104 is receiving a downlink subframe by the proper setting of the transmission time discussed above. With proper setting of the transmission time ($T_{TX}$), a POLL message from BT radio module 106 (operating as the master) may be safely transmitted during the duration of the WiMax uplink subframe. Furthermore, streamed-in audio packet 174 may be correctly received when WiMax radio module 104 is in downlink operations. The audio quality may be optimized by the proper setting of the transmission time since the bandwidth from BT slave to master can be exploited to the large extent.

Figure 13:
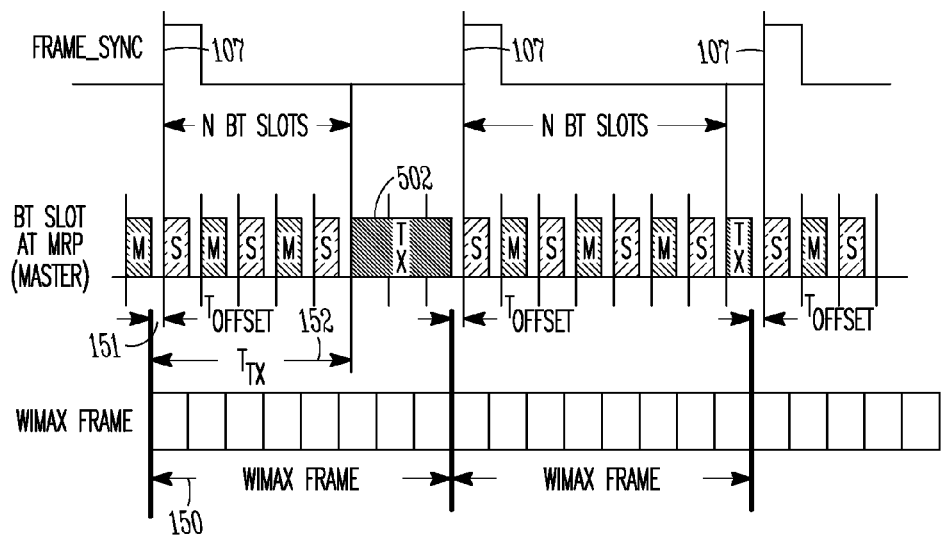
FIG. 13 illustrates the selection of a transmission time by a BT radio module for frame sync signals generated with a fixed offset with respect to a WiMax frame in accordance with some embodiments of the present invention.

FIG. 13 illustrates the selection of a transmission time by a BT radio module for frame sync signals generated with a fixed offset with respect to a WiMax frame in accordance with some embodiments of the present invention. As illustrated, frame sync signal 107 may be generated with fixed offset 151. Transmission time 152 for BT transmission slot 502 for an ACL packet may be based on a BT packet type and a BT profile. BT radio module 106 may delay transmission of an ACL packet a number (N) of BT slot times after frame sync signal 107 is observed. The number (N) of BT slot times may be selected based on the BT profile, the BT packet type and whether there is mutual interference (per table 1) or whether WiMax transmissions significantly interfere with BT receptions but BT transmissions do not significantly interfere with WiMax receptions (per table 2).

In these embodiments, frame sync signal 107 may be generated such that the time difference between frame sync signal 107 and the starting time of WiMax frame 150 (i.e., the most recent WiMax frame) before frame sync signal 107 equals $T_{offset}$. BT radio module 106 may synchronize its clock such that its slot boundary (master-to-slave or slave-to-master slot) aligns with the rising edge of the frame sync signal 107. With this, clock synchronization may be maintained by maintaining $T_{offset}$ between BT and WiMax radios. BT radio module 106 may begin ACL packet transmission N slots after it observes frame sync signal 107. In these embodiments, the values of N may be determined using Tables 1 or 2, with the knowledge of the profile used and packet type. In this way, BT radio module 106 may be able to control the transmission of an ACL packet to occur at a desired transmission time (i.e., $T_{TX}$).

Figure 14:
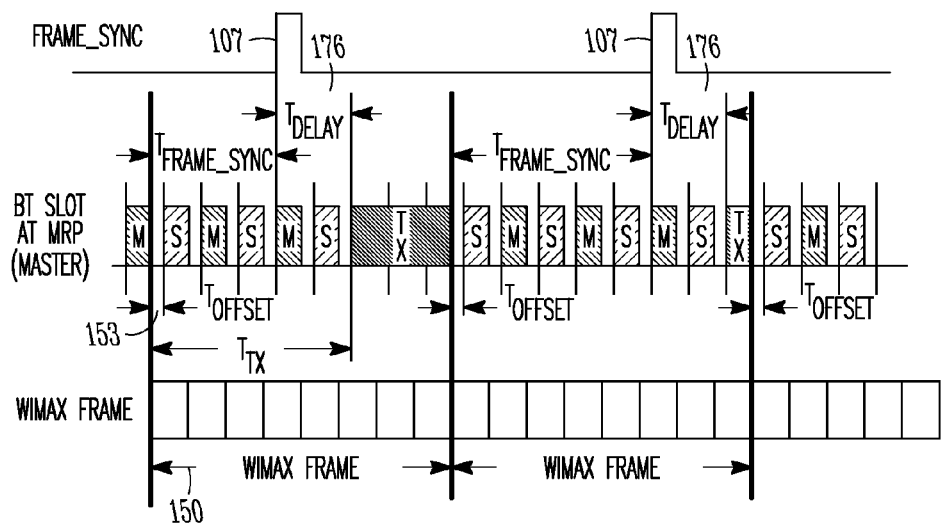
FIG. 14 illustrates the selection of a transmission time by a BT radio module for frame sync signals generated with a varying offset with respect to a WiMax frame in accordance with some embodiments of the present invention.

FIG. 14 illustrates the selection of a transmission time by a BT radio module for frame sync signals generated with a varying offset with respect to a WiMax frame in accordance with some embodiments of the present invention. In these embodiments, frame sync signal 107 may be generated with varying offset 153. The transmission time for an ACL packet may be fixed at fixed delay ($T_{delay}$) 174 after frame sync signal 107. Varying offset 153 may be selected based on the BT profile, the BT packet type and whether there is mutual interference (per table 1) or whether WiMax transmissions may significantly interfere with BT receptions but BT transmissions do not significantly interfere with WiMax receptions (per table 2).

In these embodiments, the occurrence of frame sync signal 107 may be relevant to both $T_{offset}$ and $T_{TX}$. BT radio module 106 may synchronizes its clock such that its slot boundary (master-to-slave slot or slave-to-master slot) is substantially aligned with frame sync signal 107. BT radio module 106 may begin ACL packet transmission at predetermined fixed delay ($T_{delay}$) 176 after frame sync signal 107 is observed. $T_{delay}$ may be set to an integer number of BT slot durations, although the scope of the invention is not limited in this respect. If $T_{frame\ sync}$ is used to denote the time difference between the rising edge of frame sync signal 107 and the starting time of the most recent WiMax frame before frame sync signal 107, then $T_{frame\ sync}$ may be defined by the following equation:

$$T_{FRAME\_SYNC} = T_{TX} - T_{delay} = T_{offset} + N*T_{BT\_slot} - T_{delay} \quad (2)$$

In Equation (2), both $T_{offset}$ and $T_{delay}$ may be system design choices and may be fixed once chosen. $T_{BT\_slot}$ is the BT slot duration and may be a constant equaling approximately 625 μs. Therefore, given the BT profile and the packet type used, the value of N may be determined from Table 1 or 2 for the different usage scenarios. The value of $T_{frame\ sync}$ may thus be determined and frame sync signal 107 may be generated as illustrated in FIG. 14. In these embodiments, coexist controller 114 know the profile that BT radio module 106 is using and the packet type that BT radio module 106 is transmitting.

The term Bluetooth, as used herein may refer to any short-haul wireless protocol frequency hopping spread-spectrum (FHSS) communication technique operating in the 2.4 GHz spectrum. The term WiMax may refer to any broadband wireless communication technique that may implement an orthogonal frequency division multiple access (OFDMA) technique that may potentially interfere with the spectrum utilized by BT, including interference due to out-of-band (OOB) emissions.

Although multi-radio wireless communication device 102 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of system 100 (FIG. 1) may refer to one or more processes operating on one or more processing elements.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Embodiments of the invention may be implemented in one or a combination of hardware, firmware, and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method for communicating using a multi-radio wireless communication device having a Worldwide Interoperability for Microwave Access (WiMax) radio module and a Bluetooth (BT) radio module, the method comprising:
asserting a WiMax active signal by a coexist controller of the WiMax radio module during receipt of a downlink subframe;
aligning, by the BT radio module, a BT slot boundary of either master-to-slave or slave-to-master slot based on timing information conveyed by the WiMax active signal; and
de-asserting the WiMax active signal by the coexist controller during transmission of an uplink subframe by the WiMax radio module.

2. The method of claim 1 wherein the coexist controller comprises a single-conductor coexistence interface to provide the WiMax active signal to the BT radio module on a single conductive path,
wherein the BT radio module aligns a BT slot boundary with a rising edge of the WiMax active signal,
wherein the WiMax active signal is asserted by the coexist controller during the downlink subframe with a predetermined latency, wherein the predetermined latency is fixed by the coexist controller and ranges up to approximately a duration of a BT slot.

3. The method of claim 2 wherein a time offset between a start of a WiMax frame and a next BT slave-to-master slot boundary is fixed, and
wherein the method further comprises determining a transmission time for an ACL packet, by the BT radio module, by adding the time offset to a number of BT slot times,
wherein the number of BT slot times is selected based on a BT profile and whether there is mutual interference or whether WiMax transmissions interfere with BT receptions but BT transmissions do not significantly interfere with WiMax receptions, and
wherein the time offset is selected to be less than approximately a duration of a BT slot, and further selected based on a ratio of a durations of the downlink subframe to a duration of an uplink subframe.

4. The method of claim 3 wherein the selection of the time offset and transmission time for the BT radio module allows for the communication of ACL packets of streamed audio comprising at least 3 BT slots.

5. The method of claim 1 wherein the BT radio module is configured to concurrently receive within slave-to-master slots from a BT device when the WiMax radio module is receiving during the downlink subframe when the WiMax active signal is asserted,
wherein the BT radio module is further configured to refrain from transmitting during the downlink subframe when the WiMax active signal is asserted, and
wherein the BT radio module is further configured to transmit during the uplink subframe within master-to-slave slots when the WiMax active signal is not asserted.

6. The method of claim 5 wherein the BT radio module is configured to communicate over a BT synchronous connection oriented (SCO) link, an extended SCO (eSCO) link, or BT Asynchronous Connection-Less (ACL) link established with the BT device, and
wherein when the WiMax active signal is asserted during a transmission by the BT radio module, the BT radio module is configured to stop the transmission and reschedule the transmission in accordance with an automatic retransmission request (ARQ) technique for the established link.

7. The method of claim 5 wherein the coexist controller comprises a two-conductor coexistence interface to provide the WiMax active signal and a frame sync signal to the BT radio module on two separate conductive paths, and
wherein the method further comprises generating the frame sync signal with either fixed offset or a varying offset with respect to a start of a current WiMax frame, and
wherein rather than aligning the BT slot boundary with the WiMax active signal, the BT radio module substantially aligns the BT slot boundary with the frame sync signal.

8. The method of claim 7 wherein when the frame sync signal is generated with the fixed offset, the method comprises adjusting a transmission time for a BT transmission slot by the BT radio module based on a BT packet type and a BT profile, and
wherein the fixed offset ranges up to approximately a duration of a BT slot.

9. The method of claim 8 wherein when the frame sync signal is generated with the fixed offset, the method comprises:
adjusting a transmission time for a BT transmission slot by the BT radio module for an ACL packet based on a BT packet type and a BT profile,
wherein the BT radio module delays transmission of an ACL packet a number of BT slot times after the frame sync signal is observed,
wherein the number of BT slot times is selected based on the BT profile, the BT packet type and whether there is mutual interference or whether WiMax transmissions interfere with BT receptions but BT transmissions do not significantly interfere with WiMax receptions.

10. The method of claim 7 wherein when the frame sync signal is generated with the varying offset, the method comprises fixing the transmission time for the BT transmission slot at a fixed delay after the frame sync signal, and
wherein the varying offset is less than a duration of a WiMax frame.

11. The method of claim 10 wherein when the frame sync signal is generated with the varying offset, the method comprises fixing the transmission time for an ACL packet at a fixed delay after the frame sync signal, and
wherein the varying offset is selected based on the BT profile, the BT packet type and whether there is mutual interference or whether WiMax transmission interferes with BT receptions but BT transmissions do not significantly interfere with WiMax receptions.

12. The method of claim 7 further comprising refraining from asserting the WiMax active signal when BT transmissions by the BT radio module are determined not to significantly interfere with WiMax receptions by the WiMax radio module.

13. The method of claim 5 wherein the coexist controller comprises a three-conductor coexistence interface to provide the WiMax active signal and a frame sync signal to the BT radio module on two separate conductive paths and to receive a BT state signal from the BT radio module on a third separate conductive path,
wherein the rather than aligning the BT slot boundary with the WiMax active signal, the BT radio module substantially aligns the BT slot boundary with the frame sync signal, and
wherein the method further comprises:
receiving an asserted BT state signal when the BT radio module to gain priority over WiMax operations; and
electing, in response to the assertion of the BT state signal by the BT radio module, whether or not to de-assert the WiMax active signal and give the BT radio module priority.

14. The method of claim 5 wherein the coexist controller comprises a three-conductor coexistence interface to provide the WiMax active signal to the BT radio module on one conductive path and to receive a BT state signal and a BT request signal from the BT radio module on two separate conductive paths,
wherein the BT state signal indicates whether the BT radio module is requesting to priority for a transmission or a reception, and
wherein the method further comprises:
receiving an asserted BT state signal when the BT radio module to gain priority over WiMax operations;
receiving the BT request signal 804 indicating that the BT radio module is requesting assess to a wireless medium; and
electing, in response to the assertion of the BT state signal and the receipt of the BT request signal whether or not to de-assert the WiMax active signal and allow the BT radio module access to the medium, wherein the WiMax active signal provides protection for receiving the downlink subframe and is used by the BT radio module for timing synchronization.

15. The method of claim 5 wherein the coexist controller comprises a four-conductor coexistence interface to provide the WiMax active signal and a frame sync signal to the BT radio module on two separate conductive paths and to receive a BT state signal and a BT request signal from the BT radio module on two additional separate conductive paths of the interface, wherein the rather than aligning the BT slot boundary with the WiMax active signal, the BT radio module substantially aligns the BT slot boundary with the frame sync signal, wherein the BT state signal indicates whether the BT radio module is requesting to priority for a transmission or a reception, and wherein the method further comprises:

receiving an asserted BT state signal when the BT radio module to gain priority over WiMax operations;

receiving the BT request signal 804 indicating that the BT radio module is requesting assess to a wireless medium; and electing, in response to the assertion of the BT state signal and the receipt of the BT request signal whether or not to de-assert the WiMax active signal and allow the BT radio module access to the medium, wherein the WiMax active signal provides protection for receiving the downlink subframe and the frame sync signal is used by the BT radio module for timing synchronization.

16. A multi-radio wireless communication device comprising a Worldwide Interoperability for Microwave Access (WiMax) radio module and a Bluetooth (BT) radio module, wherein the WiMax radio module includes a coexist controller that is configured to assert a WiMax active signal during receipt of a downlink subframe, wherein the BT radio module is configured to align a BT slot boundary of either master-to-slave or slave-to-master slot based on timing information conveyed by the WiMax active signal, and wherein the coexist controller is configured to de-assert the WiMax active signal by the coexist controller during transmission of an uplink subframe by the WiMax radio module.

17. The multi-radio wireless communication device of claim 16 wherein the coexist controller comprises a single-conductor coexistence interface to provide the WiMax active signal to the BT radio module on a single conductive path, wherein the BT radio module aligns a BT slot boundary with a rising edge of the WiMax active signal, wherein the WiMax active signal is asserted by the coexist controller during the downlink subframe with a predetermined latency, wherein the predetermined latency is fixed by the coexist controller and ranges up to approximately a duration of a BT slot.

18. The multi-radio wireless communication device of claim 16 wherein the BT radio module is configured to concurrently receive within slave-to-master slots from a BT device when the WiMax radio module is receiving during the downlink subframe when the WiMax active signal is asserted, wherein the BT radio module is further configured to refrain from transmitting during the downlink subframe when the WiMax active signal is asserted, and wherein the BT radio module is further configured to transmit during the uplink subframe within master-to-slave slots when the WiMax active signal is not asserted.

19. The multi-radio wireless communication device of claim 18 wherein the coexist controller comprises a two-conductor coexistence interface to provide the WiMax active signal and the frame sync signal to the BT radio module on two separate conductive paths, and wherein the coexist controller is configured to generate the frame sync signal with either fixed offset or a varying offset with respect to a start of a current WiMax frame, and wherein rather than aligning the BT slot boundary with the WiMax active signal, the BT radio module substantially aligns the BT slot boundary with the frame sync signal.

20. The multi-radio wireless communication device of claim 19 wherein when the frame sync signal is generated with the fixed offset, wherein the BT radio module is configured to adjust a transmission time for a BT transmission slot based on a BT packet type and a BT profile, and wherein the fixed offset ranges up to approximately a duration of a BT slot.

21. The multi-radio wireless communication device of claim 19 wherein when the frame sync signal is generated with the varying offset, wherein the BT radio module is configured to fix the transmission time for the BT transmission slot at a fixed delay after the frame sync signal, and wherein the varying offset is less than a duration of a WiMax frame.

22. The multi-radio wireless communication device of claim 19 wherein the coexistence interface is configured to refrain from asserting the WiMax active signal when BT transmissions by the BT radio module are determined not to significantly interfere with WiMax receptions by the WiMax radio module.

23. The multi-radio wireless communication device of claim 18 wherein the coexist controller comprises a three-conductor coexistence interface to provide the WiMax active signal and a frame sync signal to the BT radio module on two separate conductive paths and to receive a BT state signal from the BT radio module on a third separate conductive path, wherein the rather than aligning the BT slot boundary with the WiMax active signal, the BT radio module is configured to substantially align the BT slot boundary with the frame sync signal, wherein the BT radio module is configured to asset the BT state signal to gain priority over WiMax operations, and wherein the WiMax radio module is configured to elect, in response to the assertion of the BT state signal, whether or not to de-assert the WiMax active signal and give the BT radio module priority.

24. The multi-radio wireless communication device of claim 18 wherein the coexist controller comprises a four-conductor coexistence interface to provide the WiMax active signal and a frame sync signal to the BT radio module on two separate conductive paths and to receive a BT state signal and a BT request signal from the BT radio module on two additional separate conductive paths of the interface, wherein the rather than aligning the BT slot boundary with the WiMax active signal, the BT radio module is configured to substantially align the BT slot boundary with the frame sync signal, wherein the BT state signal indicates whether the BT radio module is requesting to priority for a transmission or a reception, and wherein the BT radio module is configured to assert the BT state signal to gain priority over WiMax operations;

wherein the BT radio module is configured to generate the BT request signal 804 indicating that the BT radio module is requesting assess to a wireless medium, wherein the WiMax radio module is configured to elect, in response to the assertion of the BT state signal and the receipt of the BT request signal whether or not to de-assert the WiMax active signal and allow the BT radio module access to the medium.

25. A computer-readable medium that stores instructions for execution by one or more processors to perform the following operations for communicating using a multi-radio wireless communication device having a Worldwide Interoperability for Microwave Access (WiMax) radio module and a Bluetooth (BT) radio module, the operations comprising:

asserting a WiMax active signal by a coexist controller of the WiMax radio module during receipt of a downlink subframe;

aligning, by the BT radio module, a BT slot boundary of either master-to-slave or slave-to-master slot based on timing information conveyed by the WiMax active signal or a frame sync signal; and de-asserting the WiMax active signal by the coexist controller during transmission of an uplink subframe by the WiMax radio module.

26. The computer-readable medium of claim 25 wherein the coexist controller comprises a single-conductor coexistence interface to provide the WiMax active signal to the BT radio module on a single conductive path, wherein the instructions, when further implemented cause the one or more possessors to cause the BT radio module to align a BT slot boundary with a rising edge of the WiMax active signal, wherein the WiMax active signal is asserted by the coexist controller during the downlink subframe with a predetermined latency, wherein the predetermined latency is fixed by the coexist controller and ranges up to approximately a duration of a BT slot.

27. The computer-readable medium of claim 26 wherein the instructions, when further implemented cause the one or more possessors to cause:

the BT radio module to concurrently receive within slave-to-master slots from a BT device when the WiMax radio module is receiving during the downlink subframe when the WiMax active signal is asserted, the BT radio module to refrain from transmitting during the downlink subframe when the WiMax active signal is asserted, and the BT radio module to transmit during the uplink subframe within master-to-slave slots when the WiMax active signal is not asserted.

\* \* \* \* \*